UNITED STATES PATENT OFFICE.

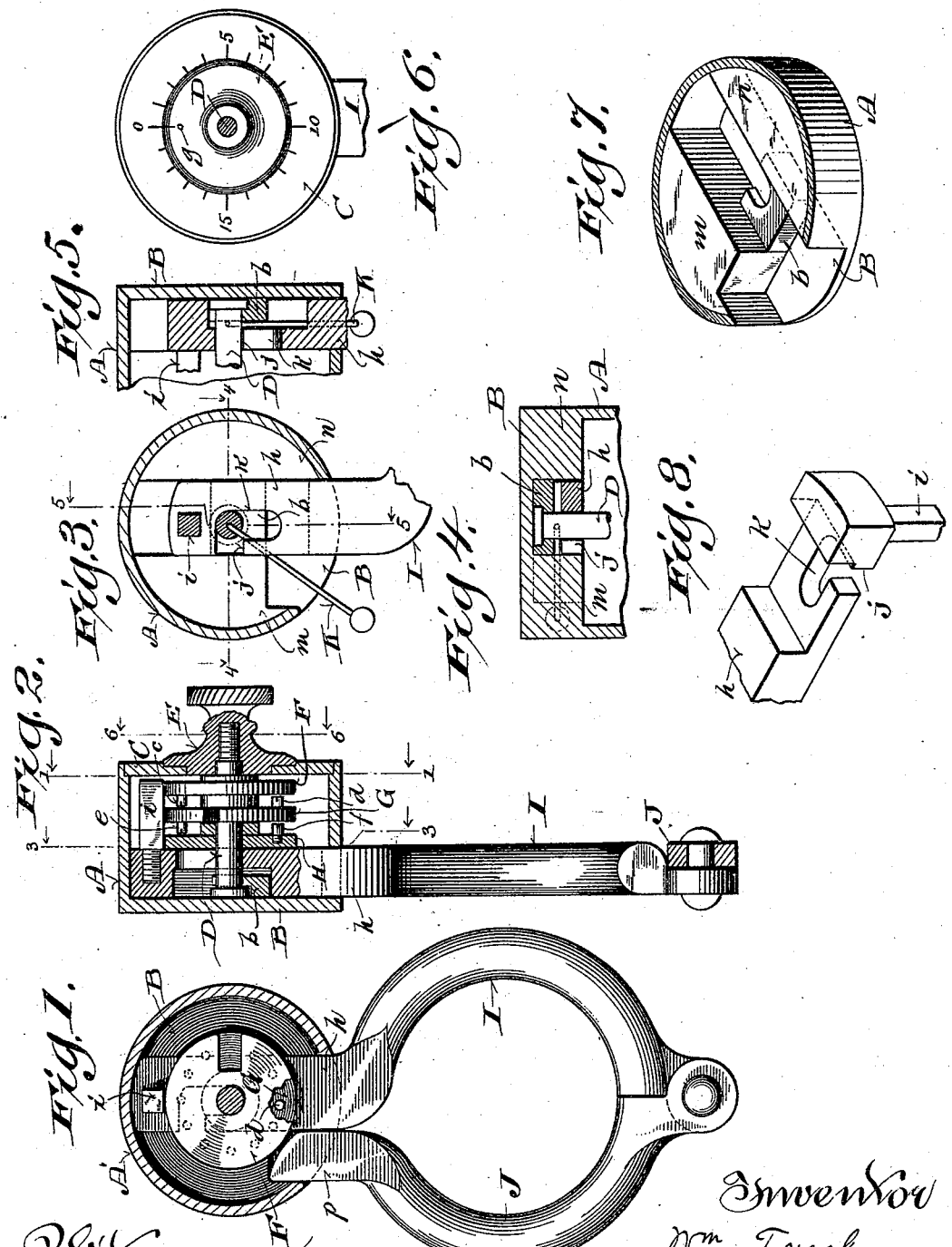

WILLIAM TYACK, OF LAYTON PARK, WISCONSIN, ASSIGNOR OF FIVE-SIXTHS TO JOHN TYACK, OF SAME PLACE, WILLIS McDERMOTT, OF CHICAGO, ILLINOIS, AND ANTON M. LOHR, PHILLIP J. LOHR, AND AUGUST F. W. KRINGEL, OF MILWAUKEE, WISCONSIN.

PERMUTATION-PADLOCK.

SPECIFICATION forming part of Letters Patent No. 552,340, dated December 31, 1895.

Application filed May 23, 1895. Serial No. 550,386. (No model.)

*To all whom it may concern:*

Be it known that I, WILLIAM TYACK, a citizen of the United States, and a resident of Layton Park, in the county of Milwaukee and State of Wisconsin, have invented certain new and useful Improvements in Combination-Padlocks; and I do hereby declare that the following is a full, clear, and exact description thereof.

My invention has for its object to provide a simple, strong and economical combination padlock, the same consisting in certain peculiarities of construction and combination of parts hereinafter set forth with reference to the accompanying drawings, and subsequently claimed.

In the drawings, Figure 1 represents a plan view of my lock, partly in section, on line 1 1 of Fig. 2; Fig. 2, a view of the lock as it appears partly in vertical section; Fig. 3, a detail sectional view taken on line 3 3 of Fig. 2; Fig. 4, a similar view taken on line 4 4 of Fig. 3; Fig. 5, a like view taken on line 5 5 of Fig. 3; Fig. 6, a detail plan view, partly in section, on line 6 6 of Fig. 2; Fig. 7, a detail perspective view illustrating a portion of a casing that constitutes part of the lock, and Fig. 8 a similar view of a portion of the hasp.

Referring by letter to the drawings, A represents the wall of cylindrical casing, B a head in one piece with the wall, and C a detachable head that is seated in said wall and held against rotation by any suitable means, it being possible to remove the latter head in order that access may be had to mechanism contained in the casing.

The casing-head B is provided upon its inner face with an offset bearing-block $b$ for the headed inner end of a central arbor D, and run on the screw-threaded outer end of the arbor is an annular knob E having a flanged inner end in loose engagement with the other casing-head C, above specified. Arranged on the arbor within the casing are a series of disks, each of which is provided with a radial notch of suitable depth. The disks are spaced apart on the arbor and all but the one, F, is loose thereon. This fixed disk turns with said arbor and has a lateral pin $c$ that collides with a similar pin $d$ belonging to the disk G, and another lateral pin $e$ belonging to the latter disk is arranged to collide with a like pin $f$ on the disk H, whereby the several disks may be adjusted to bring their notches into register. The mechanism thus far described is similar to that in various combination locks, and as is common in such devices each disk is preferably provided with a series of suitable openings arranged on a circle to permit adjustment of the pins, so as to indefinitely vary the combination, the disk-slots being made to correspond with arbitrarily-selected divisions of the index. The pointer $g$ for the index is shown on the knob E; but it is just as practical to have the index on said knob and the pointer on the adjacent head of the casing. A longitudinally-slotted shank $h$ of a hasp-section I, extended up through a slot in the casing-wall, engages the arbor D and is provided with a lateral arm $i$ for engagement with the disk-notches when the latter are in register, said shank being recessed to clear the bearing-block $b$ for said arbor. In order to facilitate placing of the hasp-section shank $h$ in working position, I provide it with a lateral notch $j$, intercepting the longitudinal slot $k$ that engages the aforesaid arbor.

Blocks $m$ $n$ in the casing flank the bearing-block $b$ and serve as guides for the shank of the hasp-section I, the first of said blocks being cut away adjacent to the casing-slot to form a recess for the engagement of a shank $p$, belonging to another hasp-section J in hinge connection with the one aforesaid, said hasp-sections being preferably of semicircular contour.

From the foregoing it will be understood that when the hasp is closed and pushed inward the shank $p$ of the section J will be caught in the casing, and at the same time the arm $i$ on the shank $h$ of section I is disengaged from the disk-notches. Now if the knob E be rotated the combination will be broken and said hasp held against retraction by the periphery of one or more disks F G H in opposition to said arm. The combination being set to bring the disk-notches into register with each other in line with the arm $i$ of the shank, the hasp may be pulled outward to disengage its section J from the casing, after which this section may be swung open on its hinge-joint with the other section.

In order to prevent the arbor D from turning when the knob E is being run on or the combination adjusted, I provide it with a transverse opening for the engagement of a stay-pin K inserted through the casing-slot in rear of the recessed portion of the shank $h$ when the hasp is open.

Having thus described my invention, what I claim as new, and desire to secure by Letters Patent, is—

1. A combination padlock comprising a slotted casing, a knob-controlled arbor rotative in the same, fast and loose radially notched disks on the arbor, interfering pins extending laterally from the disks, a jointed hasp having the sections thereof provided with shanks engageable with the casing-slot, one of said shanks being also in reciprocative engagement with said arbor, an arm on this arbor-engaging shank engageable with the disk-notches when the latter are brought into register, and suitable means for determining the registration of said notches.

2. A combination padlock comprising a slotted casing having a head thereof provided with an offset bearing-block, a headed knob-controlled arbor engaging the block, fast and loose radially notched disks on the arbor, interfering pins extending laterally from the disks, a jointed hasp having the sections thereof provided with shanks engageable with the casing-slot, one of these shanks having a longitudinally slotted portion engaging said arbor and recessed to clear said bearing-block, an arm on the slotted shank engageable with the disk-notches when the latter are brought into register, and suitable means for determining the registration of said notches.

3. A combination padlock comprising a slotted casing provided with guide-blocks one of which is cut away to form a recess adjacent to the slot, a knob-controlled arbor rotative in the casing, fast and loose radially notched disks on the arbor, interfering pins extending laterally from the disks, a jointed hasp having the sections thereof provided with shanks engageable with the casing slot, one of said shanks being intermediate of the guide-blocks and in reciprocative engagement with said arbor, an arm on this arbor-engaging shank engageable with the disk-notches when the latter are brought into register, and suitable means for determining the registration of said notches.

4. A combination padlock comprising a casing having a slotted wall and a detachable head, an arbor supported in the casing, a flanged knob screw-threaded on the arbor to loosely engage said casing head, fast and loose radially notched disks on the arbor, suitable means for determining registration of the disk notches with each other, a jointed hasp having the sections thereof provided with shanks engageable with the casing-slot one of said shanks being also in reciprocative engagement with said arbor, and an arm on this arbor-engaging shank engageable with said disk-notches when the latter are in register.

In testimony that I claim the foregoing I have hereunto set my hand, at Milwaukee, in the county of Milwaukee and State of Wisconsin, in the presence of two witnesses.

WILLIAM TYACK.

Witnesses:
H. E. OLIPHANT,
C. W. SCOTT.